Patented Apr. 23, 1929.

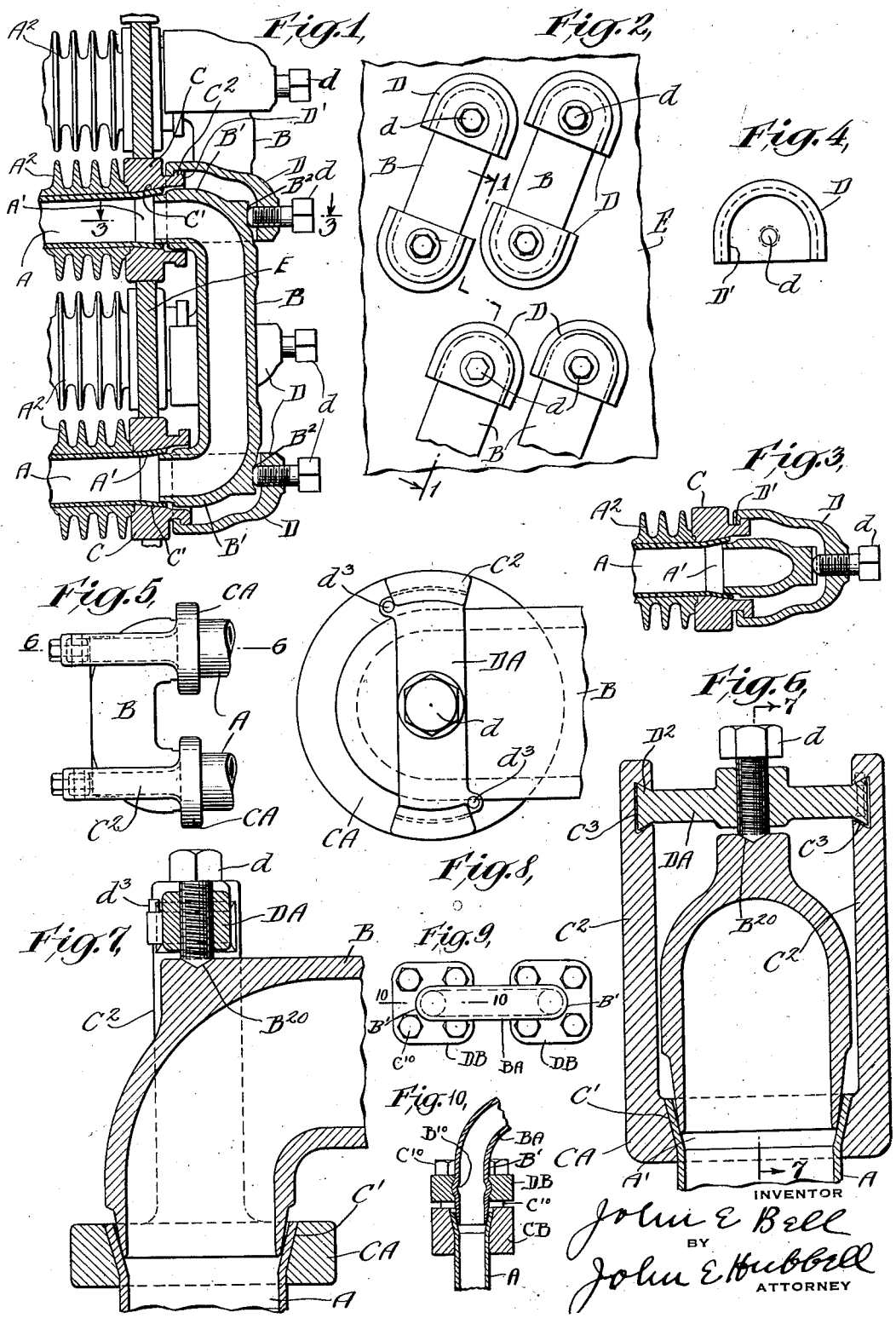

1,710,530

UNITED STATES PATENT OFFICE.

JOHN E. BELL, OF BROOKLYN, NEW YORK, ASSIGNOR TO FOSTER WHEELER CORPORATION, OF NEW YORK, N. Y., A CORPORATION OF NEW YORK.

CONNECTING TUBULAR ELEMENTS.

Application filed March 26, 1924, Serial No. 702,012, and in Great Britain August 5, 1922.

The general object of my present invention is to provide improved means for mechanically connecting communicating tubular elements. The invention was primarily devised and is especially adapted for use in detachably connecting the ends of tubes to return bends, headers, or the like, in economizers, oil heaters, or other tubular heating or heat exchanging apparatus in which a fluid at a relatively high temperature, and under a relatively high pressure, is passed into or out of the tubes through return bends, headers, or other transversely extending conduits. The invention is characterized by the mechanical simplicity and effectiveness of the provisions made for connecting the tubes proper to the return bends, headers or other end connections, as will appear from the accompanying drawings and descriptive matter in which I have illustrated preferred embodiments of my invention and to which reference should be had for a better understanding of the invention, and of specific objects and advantages attained with it.

Of the drawings:—

Figure 1 is an elevation in section on the line 1—1 of Fig. 2;

Fig. 2 is an end elevation;

Fig. 3 is a partial section on the line 3—3 of Fig. 1;

Fig. 4 is an elevation of one of the connecting parts of Figs. 1, 2 and 3;

Fig. 5 is an elevation of a portion of heating apparatus in which a modified form of the connection provisions is employed;

Fig. 6 is a section on the line 6—6 of Fig. 5;

Fig. 7 is a section on the line 7—7 of Fig. 6;

Fig. 8 is a partial end elevation of the apparatus shown in Fig. 5;

Fig. 9 is an end elevation of another form of construction; and

Fig. 10 is a partial section on the line 10—10 of Fig. 9.

In the apparatus shown in Figs. 1 to 4, inclusive, parallel tubes A are connected in pairs by the tubular elements B in the form of return bends. Each return bend B has transverse end portions B', the tip of each of which is externally tapered or cone shaped and extends into the outwardly flared or expanded end A' of the corresponding tube A. Advantageously, the cone angle of the conical external surface of the end portions B' is more acute than the cone angle of the inner surfaces of the flared tube ends A'. Each tube A and the corresponding end of the return bend B are mechanically secured together by what may be called a clamping yoke, which is formed by separable parts C and D. The part C in the form of a collar which surrounds the corresponding tube A and is internally tapered at C' to provide a seat for the outwardly flared tube end portion A'. The latter may be given its flared shape after the collar C is slipped over the end of the tube in the same manner in which boiler tubes are ordinarily expanded into tube sheets or headers. At its outer end, the collar C is formed with a neck portion of reduced diameter, provided at its free end with an external flange or circumferential rib $C^2$. The clamping yoke part D is in the form of a hollow shell, open at one side. One end wall of this shell is formed with a notch D', so shaped that in the assembled apparatus the edge of the notch fits snugly about the reduced neck portion of the collar member C for 180°, while the inner face of the end wall of the member D bears against the inner side of the flange $C^2$ for considerably more than 180° about the axis of the tube A. The opposite end of the member D extends over the remote side of the body portion of the element B.

Ordinarily an adjustable wedging or tightening device is interposed between the said remote side of the member B and the corresponding end portion of the member D. As shown, such a tightening device is provided in the form of a clamping screw $d$, which is co-axial with the tube A, and is threaded through the outer end of the member D and engages a suitable seat $B^2$ formed on the remote side of the element B. In assembling the tubes A, return bends B, and their connecting provisions, the end portions B' of the return bends B are first inserted in the ends of the corresponding tubes A, after which the members D are slid into place over the ends of the members B and the flanges $C^2$ of the collar C, and the screws $d$ are then tightened, and the reverse order of procedure is followed in disassembling the apparatus. The parts C and D may be made of various materials, depending on the conditions of use. In some cases they may be made of cast iron, and, where greater strength is required, either or both of these parts may be made of cast or forged steel.

The mechanical connecting provisions shown in Figs. 1 to 4 for holding the tubes A and the return bends B together, are obviously simple and relatively inexpensive to construct, durable and effective. They facilitate the easy and rapid initial assemblage of the apparatus in which they are used, and the separation of any return bend B from the corresponding tubes A, when this is necessary or desirable for cleaning, inspection or repairs. Furthermore, these connecting provisions are relatively compact and permit a close spacing of the tubes A, which is a matter of prime importance in some forms of apparatus in which the invention may be employed with special advantage. The manner in which the tubes and return bends are connected, and the fact that the cone angle of the inner surface of each flared tube end A' is greater than the cone angle of the outer surface of the corresponding return bend end B' insures tight joints, with an avoidance of undesirable strains, even though the two tubes connected by a single return bend are not truly parallel. The invention permits of the use of a return bend B in which the flow channel is as large in cross section at all points along its length as the bore of the tubes A, and with an avoidance of sharp turns in the flow path through the return bend. It is also an advantage that the tightening screws $d$ are so located as to be fairly cool, even though the bodies of the tubes A are located in a furnace chamber and are highly heated. The reliability and effective strength of the tightening screws $d$ are enhanced by the fact that these screws are compression members. When the apparatus is used in handling a hot fluid, the heating up and consequent thermal expansion of the return bends B tends to tighten rather than loosen the joints between the return bends and the tubes A, since the members D will not be as highly heated as the return bends.

A further advantage of the invention arises from the fact that, when the return bends B are removed to permit the cleaning of the tubes A, the seat for the return bend end B' formed by the conical inner surface of the end A' of a tube being cleaned, is somewhat out of the path, so to speak, of the tube cleaning tool, and, if need be, may readily be protected by a suitable bushing or by the bevelled end of a tubular guide sleeve for the cleaning tool inserted in the end A' of the tube being cleaned, as that end is normally entered by the corresponding return bend end B'.

The particular apparatus illustrated in Figs. 1 to 4, is an economizer in which the tubes A are surrounded by externally corrugated metallic casing sections $A^2$, and in which the collars C are circular in outline and as large, or ordinarily slightly larger in diameter than the casing sections $A^2$, and are snugly seated in circular apertures in a tube sheet E, forming a part of the economizer casing. The last mentioned features of construction, which facilitate the ready removal of the tubes A from the economizer casing when necessary, while novel with me, are not claimed herein, but are claimed in my prior application Serial No. 336,284, filed November 7, 1919, of which this application is in part a continuation.

In Figs. 5 to 8, inclusive, I have illustrated a modification of my invention, which was primarily devised for use in an oil heater, but those skilled in the art will understand that this form of my invention may be used in an economizer, and in general, that any of the forms of construction illustrated herein may be employed in many other forms of apparatus than those specifically mentioned herein. The form of apparatus shown in Figs. 5 to 8, inclusive, comprises tubes A and return bends B, which may be and are shown as similar in form to the parts A and B respectively of the apparatus first described, but in Figs. 5 to 8 the clamping yoke is formed of parts CA and DA, which are quite different in shape from the parts C and D first described. The collar member CA is in the form of an annulus having a tapered seat C' for the flared end of the corresponding tube A, and is provided at its front edge with a pair of integral extensions or arms $C^2$ which are parallel to the axis of the tube A, and have provisions at their outer ends for interlocking with the ends of the corresponding member DA. The latter, as shown, is in the form of a bar provided at its center with a hub portion threaded to receive the tightening screw $d$, and having its ends enlarged to form tenon-like ports $D^2$, which are received in undercut slots $C^3$ formed in the inner sides of the arm $C^2$. In this form of the invention the seats $B^{20}$ formed in the remote outer sides of the return bends B, are in the form of socket bearings for the ends of the screws $d$, so that when the latter are loosened, each bar DA may be turned about the corresponding screw $d$ as a pivot to move the ends $D^2$ into and out of the slots $C^3$. Advantageously the members DA are provided with stops, shown as formed by the heads of screws $d^3$ tapped into the ends of the members DA in one direction, and thus facilitate the registration of the parts in assembling the apparatus. For apparatus in which the fluid passing through the tubes A is under considerable pressure, the collar member CA is advantageously formed of cast steel, while the member DA may be formed of forged steel.

In Figs. 9 and 10 I have illustrated a construction possessing many of the advantages characterizing the constructions previously described, in which each return bend BA is in the form of a tube section, which may be of the same diameter as the tubes A and is bent into and advantageously, as shown, the form of an arc with parallel end portions B'. Adjacent each end of the part BA is expanded to form a circular corrugation or external hollow rib $B^{10}$, filling a corresponding circular groove formed in the inner surface of a collar DB thereby securing it to the return bend. Each collar DB is secured to the collar CB surrounding the flared end of the corresponding tube A, as by means of stud bolts $C^{10}$. The construction shown in Figs. 9 and 10 is well adapted for use in connecting the tubes of boilers operating under such high steam pressures as 1,000 to 1,500 lbs. per square inch.

While in accordance with the provisions of the statutes, I have illustrated the best forms of my invention now known to me, it will be apparent to those skilled in the art that various changes in the form of the apparatus specifically disclosed herein may be made without departing from the spirit of my invention as set forth in the appended claims; and that certain features of my invention may sometimes be used with advantage, without a corresponding use of other features.

Having now described my invention, what I claim as new and desire to secure by Letters Patent, is:

1. The combination with a tubular element having an expanded end, of a second tubular element having a transverse end portion which is inserted in said expanded end to thereby connect said elements for series flow therethrough, and a yoke securing said elements together and formed of separable parts, one of which comprises a collar surrounding the first mentioned element, and another of which engages the remote side of said second element.

2. The combination with a tubular element having an end, expanded to give its inner surface a conical form, of a second tubular element having a transverse end portion which enters said expanded end to thereby connect said elements for series flow therethrough, and having outer surface in the form of a cone the angle of which is more acute than that of the first mentioned surface, and a yoke securing said elements together and formed in separable parts, one of which comprises a collar surrounding the first mentioned element and another of which engages the remote side of said second element.

3. The combination with a tubular element having an expanded end, of a second tubular element having a transverse end portion which enters said expanded end, to thereby connect said elements for series flow therethrough, a yoke securing said elements together comprising a collar encircling the first mentioned element and formed with an external groove, a shell-like member having a shoulder portion at one end which enters said groove and thereby detachably connects said member to said collar and having a portion of its other end extending across the remote side of said second element and holding the latter in place.

4. The combination with a tubular element having an expanded end of a collar surrounding said element and formed with its bore flared to receive said expanded end, of a second tubular element having a transverse end portion extending into and seated against the flared inner surfaces of said expanded end to thereby connect said elements for series flow therethrough, and means connected to said collar for securing said elements together.

Signed at New York city, in the county of New York and State of New York, this 25th day of March, 1924.

JOHN E. BELL.